Figure 1:
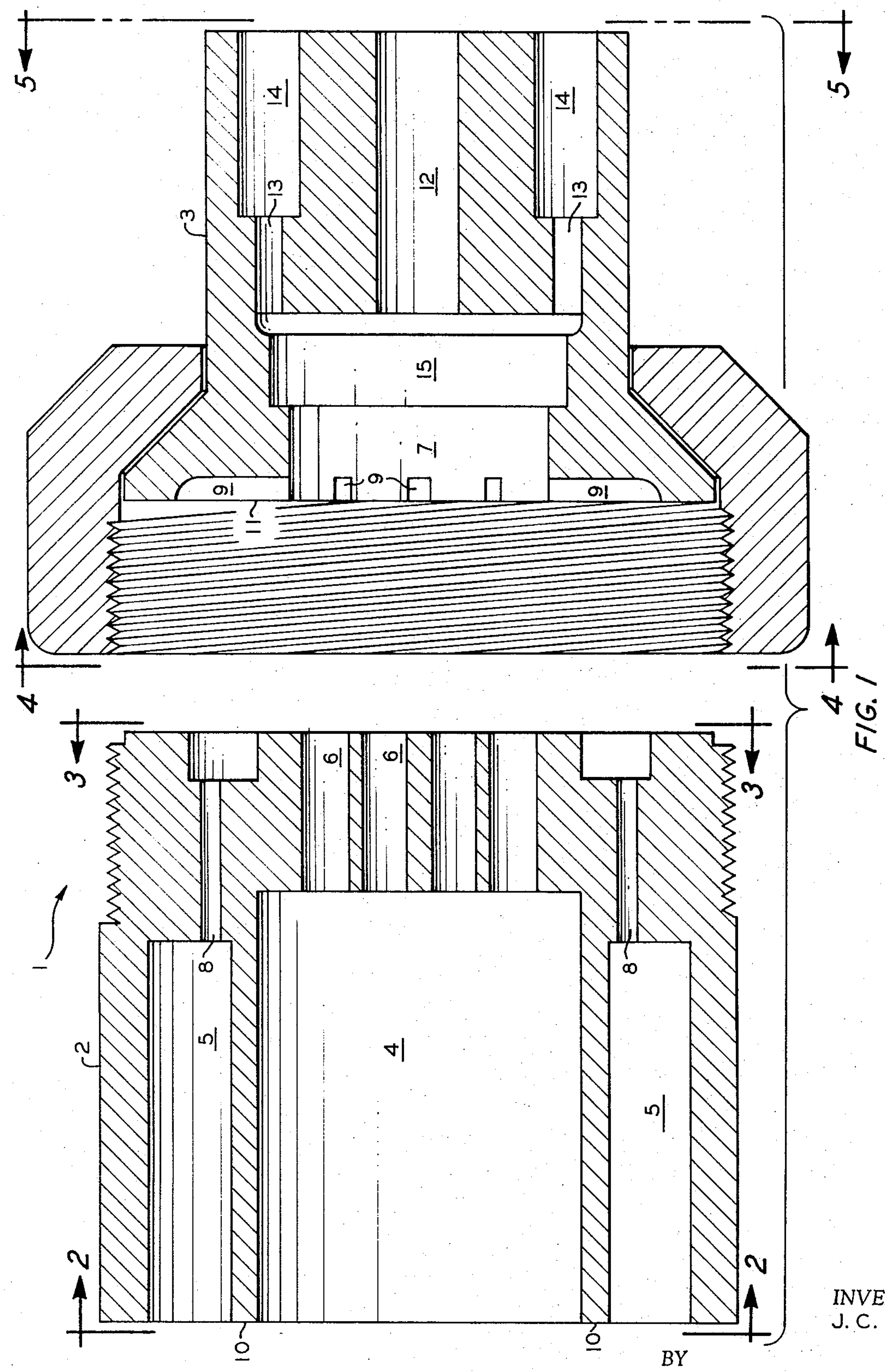

United States Patent [19]

Krejci

[11] 3,867,513

[45] Feb. 18, 1975

[54] METHOD FOR PRODUCING CARBON BLACK

[75] Inventor: Joseph C. Krejci, Phillips, Tex.

[73] Assignee: Phillips Petroleum Company, Bartlesville, Okla.

[22] Filed: Jan. 8, 1970

[21] Appl. No.: 1,432

[52] U.S. Cl. ................ 423/450, 23/259.5, 423/445, 423/455, 423/456

[51] Int. Cl. ............................ C09c 1/48, C09c 1/50

[58] Field of Search ............. 23/209.4, 209.6, 259.5, 23/209.2, 209.8, 277; 239/556, 558; 260/679

[56] References Cited

UNITED STATES PATENTS

| | | | |
|---|---|---|---|
| 2,499,438 | 3/1950 | Wiegand et al. | 23/209.8 |
| 3,003,854 | 10/1961 | Heller | 23/209.4 |
| 3,003,855 | 10/1961 | Heller et al. | 23/209.4 |
| 3,010,794 | 11/1961 | Friauf et al. | 23/209.4 |

FOREIGN PATENTS OR APPLICATIONS

| | | | |
|---|---|---|---|
| 1,011,905 | 12/1965 | Great Britain | 23/209.2 |

OTHER PUBLICATIONS

Drogin "Development and Status of Carbon Black" 1945, page 90.

"Cabot Carbon Blacks" 2nd Edition, Godfrey L. Cabot, Inc., Nov. 1953, pages 46 & 47.

"Kirk Othmer Encyclopedia of Chemical Technology" 2nd Ed. 1964, Vol. 4, page 255.

*Primary Examiner*—Edward J. Meros

[57] ABSTRACT

A method and apparatus for introducing charge oil and a dispersant as a mixture into a carbon black reactor to establish two zones of charge oil at different entrance velocities into the reactor.

8 Claims, 5 Drawing Figures

INVENTOR.
J. C. KREJCI

BY

Young & Quigg
ATTORNEYS

PATENTED FEB 18 1975

3,867,513

INVENTOR.
J.C. KREJCI

BY

Young & Quigg
ATTORNEYS

METHOD FOR PRODUCING CARBON BLACK

This invention relates to carbon black production.

In one of its more specific aspects, this invention relates to the production of large particle carbon black by the furnace process, the properties of the carbon black closely approaching the properties of that carbon black produced by the thermal process.

Generally, the furnace process for the production of large particle carbon black involves dispersing a hydrocarbon feedstock as a highly concentrated mass of finely divided particles in a substantially vertically positioned reactor at temperatures within the lower range of carbon black formation and passing the hot concentrated mass of hydrocarbon and other reactants through the reactor at low velocities to produce large particle size, low structure black.

The process employs as feed, fuel, oxidants and reactants, those materials conventionally employed in the production of carbon black, in the state in which these reactants are normally employed. While vertical positioning of the reactor is not essential to the process, it is preferred since downward flow of the make-oil may affect the carbon black formation and minimize its recirculation within the reactor.

The process employs a total air to oil ratio of from about 250 to about 450 scf per gallon. Velocities of the reactants within the reactor, based upon their chemical compositions when introduced into the reactor and upon the temperature and pressure within the reactor, are less than about 16 feet per second. The carbon black formation temperature employed is about 2,400° to 2,500° F. at a pressure of from about 15 psia to about 30 psia. Aftertreating of the black is preferably conducted to obtain carbon black having a photelometer of about 90, a nitrogen surface area of from about 5 to about 20 and a structure from about 35 to about 110.

There has now been discovered an improvement to this process, primarily concerning the method of introducing the hydrocarbon feed, or charge stock, into the reactor. This invention provides that improved method.

According to the method of this invention, hydrocarbon and a dispersant are introduced into the reactor as a high velocity centrally positioned stream and as a lower velocity peripherally positioned stream to form two different inlet velocity masses, the central mass being introduced at from two to about six times the velocity of the peripheral mass.

According to the apparatus of this invention, there is provided a nozzle having a centrally-positioned port and a plurality of peripherally positioned ports, the quantity of flow from the central port being 30 to about 80 percent the total flow, the velocity from the central port being from two to about six times the velocity from the peripheral ports.

In general, the method of this invention employs the establishment of two successively positioned make-oil concentrations formed simultaneously within the reactor. Establishment of these areas of concentrated make-oil is facilitated by employment of the apparatus of this invention, one embodiment being depicted in the attached drawings.

This apparatus emits a mixture of a dispersant and oil, preferably atomizing air and oil, at a high velocity centrally to a plurality of peripherally emitted mixtures of the same composition ejected at lesser velocities.

Figure 2:
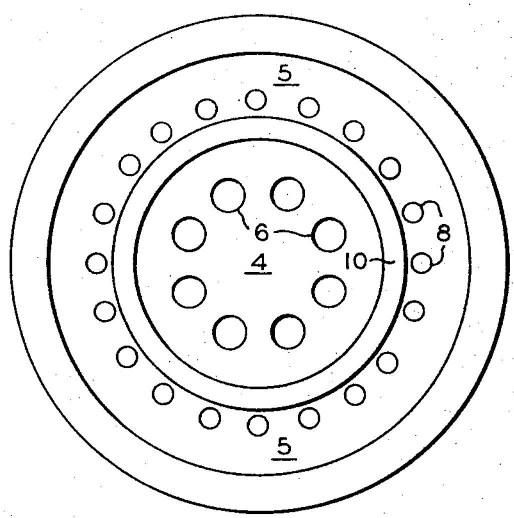
Figure 3:
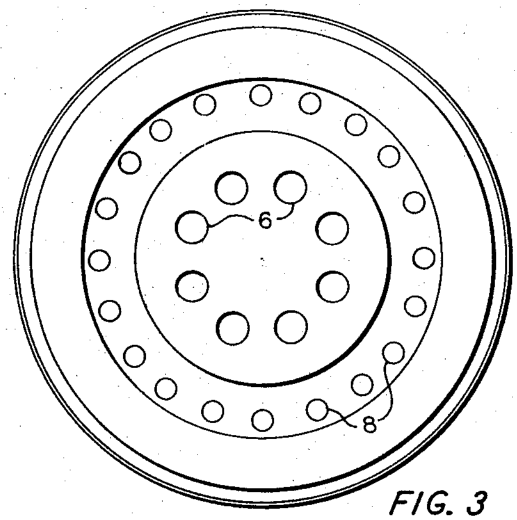
Figure 4:
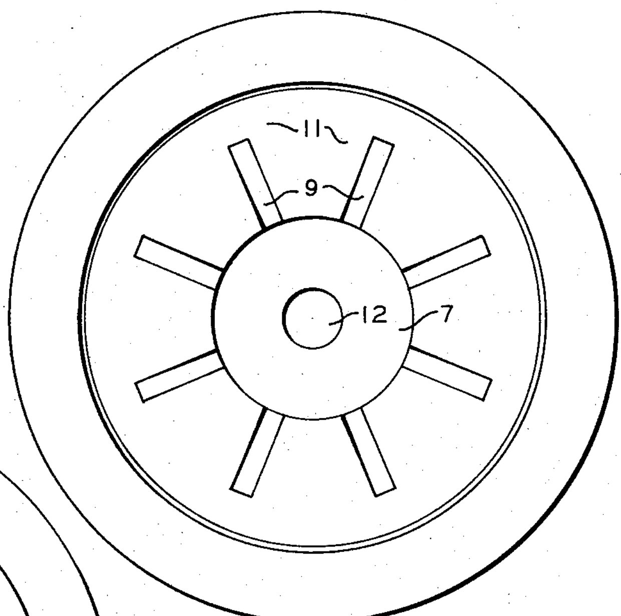
Figure 5:
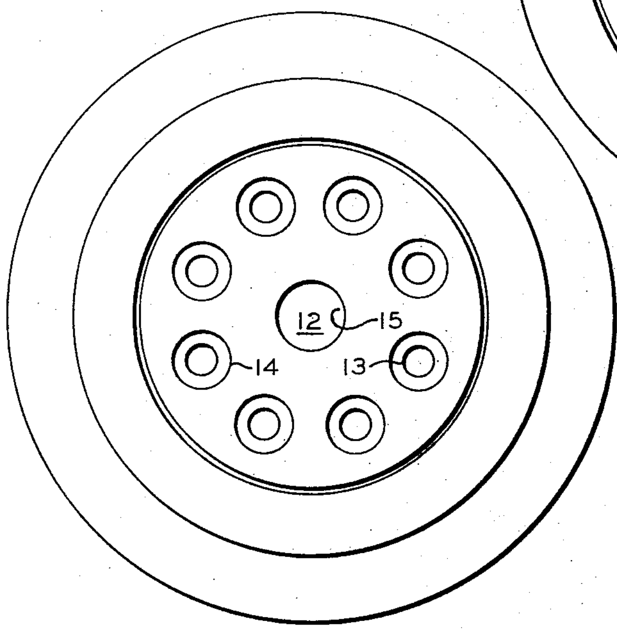

These and other objects of this invention will be evident from the attached drawings in which FIG. 1 illustrates one embodiment of the nozzle of this invention in elevational cross section, FIG. 2 is a cross-sectional view through section 2—2 of FIG. 1, FIG. 3 is a cross-sectional view through section 3—3 of FIG. 1, FIG. 4 is a cross-sectional view through section 4—4 of FIG. 1, and FIG. 5 is a cross-sectional view through section 5-5 of FIG. 1.

Referring now to the attached FIG. 1, it will be seen that the hydrocarbon charge is introduced into nozzle 1 which can be comprised of two coupled sections, introduction section 2 and mixing section 3.

Section 2 is comprised of a dispersant inlet center section 4 peripheral to which is positioned oil inlet section 5. The relationship of these sections can be reversed. As will be seen from FIG. 2, wall 10 separates the oil and air as the two materials flow through the introductory section 2 of the nozzle although they can be mixed exteriorly of the nozzle and introduced through a common conduit.

Section 4 opens into a plurality of passageways 6 which discharge into center well 7 of mixing section 3. Similarly, section 5 opens into a plurality of passageways 8 which discharge through oil passages 9 inwardly into center well 7. Having been deflected inwardly, the oil is mixed with the air, there being formed in zone 15 a uniform mixture of air and oil. As will be seen from FIGS. 3 and 4, air passageways 6 can be positioned adjacent the outlet oil passages 9. Passages 9 are formed in face 11 and the oil passes therefrom into mixing section 15. By passing the one fluid into the other, a thorough mixing of the air and oil results in zone 15.

Referring again to FIG. 1, the air-oil mixture from zone 15 passes into the plurality of the peripheral outlets 14 and into center outlet 12. Distribution is made between these peripheral outlets and the center outlet by sizing orifices 13 leading into peripheral outlets 14 so as to obtain the desired distribution between center outlet 12 and peripheral outlet 14. However, having passed through orifices 13, the air-oil mixture passes into peripheral outlets 14, the total area of outlets 14 being related to the area of outlet 12, to secure the velocities desired. Hence, both quantity and velocity distribution is obtained, the velocity of the air-oil mixture through center outlet 12 being from about two to about six times that of the velocity of the peripheral outlets 14. Orifices 13 act as restricted flow areas in communication with peripheral outlets 14 which act as peripherally positioned conduits. The total area of these restricted flow areas can be substantially equal to the area of the centrally positioned conduit or outlets, with the total area of the peripherally positioned outlets can be from about two to about six times the area of the centrally-positioned conduit or outlet. In the preferred embodiment, the total discharge area of the centrally positioned conduit is about one-third of the total area of the peripherally positioned conduits.

Referring to FIG. 5, there is shown the relationship of peripheral outlets 14 to restriction orifices 13 as situated peripheral to center outlet 12.

The nozzle described establishes air-oil mixtures which are introduced into the reactor peripherally to a centrally introduced air-oil mixture, the centrally introduced stream being introduced at a greater velocity than that of the peripherally introduced streams. Inasmuch as the heat for promoting the pyrolytic decomposition of these streams must penetrate inwardly of these peripherally introduced streams, it will be seen that the peripheral streams act to shield the central stream. This shielding, and the introduction of the central stream at the greater velocity, allows the centrally introduced stream to enter the reactor to a considerable distance before undergoing decomposition comparable to that to which the peripheral streams are subjected immediately upon their ejection from the nozzle.

The dispersant which can be introduced through the above-described nozzle can be any gaseous material including air, oxygen enriched air, an inert gas, or the like, but will be preferably air. The air so introduced can be in addition to that air which can be introduced elsewhere into the reactor, either near the introduction of the make-oil or at points downstream therefrom, or at a combination of points.

While any plurality of peripheral streams can be employed, it is preferable that at least four be used. Similarly, a plurality of centrally positioned ports can be employed, although a single port is preferred.

The fluid introduced as the dispersant will preferably be introduced in a quantity from about 5 to about 75 scf per gallon of make-oil. The makeoil will preferably be introduced in the liquid phase and can be preheated.

The nozzle will be designed to emit about 30 to about 80 percent of its total air-oil mixture through the center outlet, it being preferred that at least 50 percent be emitted through the center outlet. That material emitted through the center outlet should have imparted to it a velocity of from about two to about six times that velocity imparted to the air-oil mixture emitted from the peripheral outlets. Preferably, the velocity through the center outlet should approach sonic velocity at the prevailing conditions.

The following data indicate the operation of this invention. All runs were made in a vertical reactor.

In base Run No. I, axial air was introduced circumferentially of the nozzle and as atomizing air, all air-oil streams from the nozzle being emitted at the same velocity, there being no center outlet stream shielded by peripherally emitted outlet streams. In the balance of the runs in which the method and apparatus of this invention were employed, axial air was also introduced circumferentially of the nozzle from which was emitted a high velocity central stream surrounded by the lower velocity peripheral streams.

Primary, or first, air and fuel gas were introduced through the periphery of the reactor just downstream of the point of discharge of the airoil streams from the nozzle. A second stream of air was introduced tangentially into the reactor downstream of the primary air introduction. In all instances, an alkali metal salt was introduced for carbon black structure control, and the reaction mass was quenched in the downstream portion of the reactor to obtain a carbon black having a 90 photelometer.

Results were as follows:

TABLE I

| Run No. | Base Run I | II | III | IV | V | VI | VII |
|---|---|---|---|---|---|---|---|
| Oil Charge Rate, GPH | 93 | 91 | 84.4 | 97 | 93 | 95 | 91 |
| Dispersant Air, SCFH | 4,000 | 4,000 | 2,000 | 6,000 | 4,000 | 4,000 | 4,000 |
| Axial Air, SCFH | 5,000 | 5,000 | 5,000 | 5,000 | 5,000 | 5,000 | 5,000 |
| Central Outlet Velocity, ft./sec.* | None | 1,020 | 510 | 1,530 | 1,020 | 1,020 | 1,020 |
| Peripheral Outlet Velocity, ft./sec.* | 1,030 | 340 | 170 | 510 | 340 | 340 | 340 |
| Oil Preheat Temperature, °F | 400 | 400 | 410 | 400 | 375 | 425 | 375 |
| First Tangential Air, SCFH | 20,000 | 20,000 | 20,000 | 20,000 | 15,000 | 30,000 | 30,000 |
| Tangential Fuel Gas, SCFH | 1,300 | 1,300 | 1,300 | 1,300 | 1,100 | 1,300 | 1,300 |
| Second Tangential Air, SCFH | 9,900 | 9,900 | 10,000 | 10,000 | 15,000 | 0 | 0 |
| Dispersant Air/Oil, SCF/gal. | 43 | 44 | 23.7 | 61.8 | 43 | 42 | 44 |
| Air/Oil, SCF/ga. | 418 | 428 | 422 | 423 | 419 | 412 | 428 |
| Alkali Metal Additive, $K^+$ ppm | 953 | 812 | 789 | 838 | 796 | 780 | 810 |
| Carbon Black Properties: | | | | | | | |
| Nitrogen Surface Area, $m^2$/gm. | 16.7 | 21.06 | 19.8 | 18.6 | 19.2 | 19.8 | 19.0 |
| Structure, DBP, cc/100 gm. | 31.4 | 30 | 33 | 30 | 29.5 | 32.4 | 31.0 |
| Photelometer | 89 | 94 | 93 | 95 | 88 | 90 | 89 |
| Carbon Black Yield, No./gal. Make-oil | 5.4 | 5.1 | 5.1 | 5.2 | 4.9 | 5.2 | 5.1 |

*Calculated values at standard pressure and temperature.

It will be seen from the above that the use of a dispersant and oil mixture to establish two concentrations of make-oil within the reactor appreciably affects the surface area of the black under otherwise comparable conditions. It will also be seen that there is produced by the method of this invention, and in the presence of an alkali metal additive, a new carbon black having, at a photelometer of at least 90, a surface area of from about 19 to about 27 and a structure of from about 25 to about 34.

The above data includes values for the velocity of the center stream and velocities for the peripheral or annular streams issued from the nozzles. These values are relative only, having been calculated on the basis of the volumes involved under standard conditions of temperature and pressure. While values higher than sonic velocity are indicated, it is believed that while sonic velocity may be approached, it is in no instance exceeded.

In the above data, the streams of the air-oil mixture emitted peripheral to the center stream were parallel to the axis of the reactor and to the center stream. However, discharge of these peripheral streams can be made angularly to the center stream, either divergently or convergently.

The carbon black produced by the method of this invention, specifically that produced in Run No. II, Table I, has been compared with that black produced in Run No. I, Table I and with Medium Thermal Black, (MT), ASTM N990, by incorporation in a natural rubber recipe on which rubber data were determined. The natural rubber recipe was as follows:

TABLE II

| Component | Parts by Weight |
|---|---|
| Liberian Crepe Natural Rubber | 100 |
| Carbon Black | 75 |
| Stearic Acid | 3 |
| Sulfur | 2.5 |
| Zinc Oxide | 5 |
| Altax Accelerator (Benzothiazyl disulfide) | 0.6 |

TABLE III

| Carbon Black Product | Base Run I | Run II | MT |
|---|---|---|---|
| Mooney Viscosity at 212° F. | 44 | 41 | 44 |
| Scorch at 280° F., min. | 7 | 6 | 10 |
| 30 min. cure at 293° F. | | | |
| Compression Set, % | 25 | 24 | 30 |
| 300% Modulus, psi. | 1320 | 1220 | 790 |
| Tensile, psi | 2820 | 3450 | 2710 |
| Elongation, % | 530 | 610 | 620 |
| T, °F. | 33 | 34 | 36 |
| Resilience, % | 81 | 80 | 81 |
| Shore A Hardness | 55 | 55 | 47 |

It will be seen from the above that the black produced according to the method of this invention resulted in a higher tensile strength and a lower 300 percent modulus in the rubber produced than did that black produced in Base Run I. It will be further noted that while the MT Black has a $N_2SA$ of 8 and a structure of 35, the black of this invention was comparable to the MT black in respect to the hysteresis properties of the rubber blend, that is, in respect to the $\Delta T$ and the resilience results. This is unexpected inasmuch as it is generally accepted that high surface area blacks impart to rubber blends poorer hysteresis properties than do low surface blacks. Hence, it is seen that the black of this invention imparts to rubber blends unexpectedly high hysteresis properties.

It has been found that the discharge method and apparatus of this invention contribute significantly to reducing carbon deposition on the reactor walls and to the elimination of grit formation due to spalling of the reactor refractory.

It will be evident from the foregoing that various modifications can be made to both the method and apparatus of this invention. For example, a plurality of centrally-positioned streams can be emitted at the high velocities surrounded by the plurality of the low velocity streams, rather than the singly emitted high velocity stream discussed above. However, such modifications are considered as being within the scope of the invention.

What is claimed is:

1. A method for producing carbon black in a reactor by the pyrolytic decomposition of a hydrocarbon in the presence of an oxidant and a fuel by bringing said hydrocarbon to its carbon black forming temperature in the presence of an oxidant and a fuel, and recovering the carbon black formed, which comprises introducing said hydrocarbon into said reactor in a multiplicity of streams, a plurality of said streams being introduced peripherally to at least one centrally introduced stream, said centrally-introduced stream being introduced at a velocity of about two to about six times the velocity of the peripherally introduced streams.

2. The method as defined in claim 1 in which said streams comprise hydrocarbon and a gaseous dispersant.

3. The method as defined in claim 2 in which the quantity of said centrally-introduced stream is about 30 to about 80 percent of the total hydrocarbon and gaseous dispersant introduced in said multiplicity of streams.

4. The method as defined in claim 2 in which said dispersant is present in an amount from about 10 to about 75 scf per gallon of hydrocarbon.

5. The method as defined in claim 1 in which said streams comprise hydrocarbon and a gaseous dispersant, said dispersant being present in an amount from about 10 to about 75 scf per gallon of hydrocarbon, the quantity of said centrally introduced stream being about 30 to about 80 percent of the total hydrocarbon and dispersant introduced in said multiplicity of streams.

6. The method of claim 1 in which said reactor is positioned vertically and said oxidant is air, said air and said hydrocarbon being introduced into said reactor at a ratio within the range of from about 250 to about 450 standard cubic feet of said air per gallon of said hydrocarbon.

7. The method of claim 6 in which said hydrocarbon has a velocity through said reactor of less than about 16 feet per second.

8. The method of claim 7 in which said hydrocarbon is decomposed at a temperature within the range of from about 2400° to 2500° F. at a pressure within the range of from about 15 to about 30 psia.

* * * * *